United States Patent
Kubo (10) Patent No.: US 7,369,171 B2
(45) Date of Patent: May 6, 2008

(54) READ CONTROLLER FOR IMAGE PICK-UP DEVICE, AND IMAGE PICK-UP APPARATUS

(75) Inventor: Naoki Kubo, Asaka (JP)

(73) Assignee: Fujifilm Corporation, Tokyo (JP)

( * ) Notice: Subject to any disclaimer, the term of this patent is extended or adjusted under 35 U.S.C. 154(b) by 598 days.

(21) Appl. No.: 11/075,413

(22) Filed: Mar. 9, 2005

(65) Prior Publication Data

US 2005/0200721 A1    Sep. 15, 2005

(30) Foreign Application Priority Data

Mar. 10, 2004   (JP)   ............... 2004-066854

(51) Int. Cl.
*H04N 3/14*   (2006.01)
*H04N 9/64*   (2006.01)

(52) U.S. Cl. ...................... 348/322; 348/248

(58) Field of Classification Search .. 348/223.1–225.1, 348/248, 249, 294, 297, 302, 305, 317, 320, 348/321, 322, 323
See application file for complete search history.

(56) References Cited

U.S. PATENT DOCUMENTS 4,924,316 A * 5/1990 Kobayashi et al. ...... 348/222.1
5,260,774 A * 11/1993 Takayama ................. 348/655
7,015,965 B2 * 3/2006 Asada et al. .............. 348/312
2005/0099508 A1* 5/2005 Oda et al. ............... 348/229.1
2005/0212940 A1* 9/2005 Kobayashi ................ 348/316

FOREIGN PATENT DOCUMENTS

JP          11-331708          11/1999

* cited by examiner

*Primary Examiner*—Lin Ye
*Assistant Examiner*—Timothy J Henn
(74) *Attorney, Agent, or Firm*—McGinn IP Law Group, PLLC (57) ABSTRACT

A digital camera that captures object light by a CCD to create an image signal includes a read controller that controls reading of light signals from at least two fields of the CCD, in which a field, from which a light signal received by an R-sensor sensitive to red light is read, is separated from a field from which a light signal received by a B-sensor sensitive to blue light is read. The read controller includes: a color temperature discriminating section that discriminates a color temperature based on the light signals received from the CCD; and a read sequence controller that causes a light signal to be read first from the R-sensor when a color temperature is low and causes a light signal to be read first from the B-sensor when the color temperature is high according to a result of discrimination of the color temperature discriminating section.

4 Claims, 6 Drawing Sheets

READ CONTROLLER FOR IMAGE PICK-UP DEVICE, AND IMAGE PICK-UP APPARATUS

BACKGROUND OF THE INVENTION

1. Field of the Invention

The present invention relates to a read controller for an image pick-up device that controls reading of light signals from an image pick-up device employing an interlace reading system and to an image pick-up apparatus that creates an image signal by capturing object light by the image pick-up device.

2. Description of the Related Art

A charge coupled device (hereinafter, abbreviated as "CCD") is widely used as an image pick-up device in a digital camera as one of image pick-up apparatuses. The CCD includes a multiplicity of photoelectric transducers disposed in a matrix and color filter arrays are disposed on the multiplicity of photoelectric transducers. Note that the color filter arrays are disposed by a Bayer disposition system, a G-stripe disposition system, an R/G checkered pattern disposition system, a RGB perfect stripe disposition system, and the like. Further, in many cases, the CCD is provided with micro lenses disposed on the color filter arrays in correspondence to the respective photoelectric transducers to increase the amount of light incident on the photoelectric transducers. An R-sensor sensitive to red (R), a G-sensor sensitive to green (G), and a B-sensor sensitive to blue (B) are arranged from the photoelectric transducers, the color filter arrays, and the micro lenses.

There is known a digital camera having a mechanical shutter, a CCD acting as an image pick-up device, and a read controller for the image pick-up device. The CCD reads out (interlace reads) light signals from at least two fields, in which a field for reading a light signal received by an R-sensor sensitive to red light is separated from a field for reading a light signal received by a B-sensor sensitive to blue light, and the read controller controls reading of the light signals from the CCD. In the digital camera, light signals are read from the at least two fields in the state that the mechanical shutter is closed and no light is incident on the camera when exposure is finished. In this case, while charges are being read out by reading a light signal from an initial field (first field), the amount of charges read out by reading a light signal from a next field (second field) is kept by photoelectric transducers. Accordingly, a problem arises in that the charges read out by reading the light signal from the second field leak to an overflow drain, which is disposed to a semiconductor substrate of the CCD to discard excessive charges, in the period during which the charges are being read out by reading the light signal from the first field, and an amount of signal charges accumulated during an exposure period is reduced.

To cope with the above problem, there is proposed a technique for preventing the signal charges, which are read out by reading the light signal from the second field, from leaking to the overflow drain in the period during which the light signal is being read from the first field by setting a potential barrier between a light receiving element and the overflow drain higher in the period during which the first field is read than in the period during which exposure is executed by the light receiving element (refer to Japanese Patent Application Laid-Open No. 11-331708).

Incidentally, there is a phenomenon that the amount of signal charges, which are read out by reading the signal light from the second field, is reduced by the influence of thermal diffusion while the light signal is being read from the first field. Accordingly, it is difficult to keep the amount of signal charges (which is called an amount of saturation charges) read out by reading the light signal from the second field in an maximum possible amount. As a result, the amount of saturation charges reduced by the influence of the thermal diffusion is read, thereby an image signal output from the CCD has a narrow dynamic range, and thus it is difficult to obtain an image of high quality by the digital camera. To cope with the above problem, there is a countermeasure of changing the profile of the CCD, and the like, from which a problem also arises in that a circuit arrangement becomes complex.

SUMMARY OF THE INVENTION

The present invention has been made in view of the above circumstances and provides a read controller for an image pick-up, which can read a sufficiently large amount of charges, and an image pick-up apparatus capable of obtaining an image of high quality.

In a read controller for an image pick-up device of the present invention that controls reading of light signals from at least two fields in which a field, from which a light signal received by an R-sensor sensitive to red light is read, is separated from a field from which a light signal received by a B-sensor sensitive to blue light is read, the read controller includes: a color temperature discriminating section that discriminates a color temperature based on the light signals received by the image pick-up device; and a read sequence controller that changes a read sequence of the fields according to a result of discrimination executed by the color temperature discriminating section.

The read controller for the image pick-up device of the present invention discriminates the color temperature based on the light signals received by the image pick-up device and changes the read sequence of the fields according to a result of discrimination thereof. Accordingly, a light signal can be read first from a field having an amount of saturation charges that is a maximum amount of charges which can be accumulated in the image pick-up device. As a result, an amount of saturation charges which is reduced by the influence of thermal diffusion can be prevented from being read, thereby an image signal having a wide dynamic range can be output from the image pick-up device.

It is preferable that the read sequence controller of the read controller for the image pick-up device of the present invention cause a light signal to be read first from the R-sensor when the color temperature is low and cause a light signal to be read first from the B-sensor when the color temperature is high according to a result of discrimination executed by the color temperature discriminating section.

With the above operation, when the color temperature is low, an amount of saturation charges which is less affected by the thermal diffusion can be read out from the R-sensor. Further, when the color temperature is high, an amount of saturation charges which is less affected by the thermal diffusion can be read out from the B-sensor.

In an image pick-up apparatus of the present invention that captures object light by an image pick-up device and creates an image signal, the image pick-up device being an interlace reading type image pick-up device that reads light signals from at least two fields in which a field, from which a light signal received by an R-sensor sensitive to red light is read, is separated from a field from which a light signal received by a B-sensor sensitive to blue light is read, the image pick-up apparatus includes: a color temperature discriminating section that discriminates a color temperature based on the light signal received by the image pick-up device; and a read sequence controller that changes a read sequence of the fields according to a result of discrimination executed by the color temperature discriminating section.

The image pick-up apparatus of the present invention discriminates the color temperature based on the light signals received by the image pick-up device and changes the read sequence of the fields according to a result of discrimination thereof. Accordingly, a light signal can be read first from a field having an amount of saturation charges that is a maximum amount of charges which can be accumulated in the image pick-up device. As a result, an amount of saturation charges which is reduced by the influence of thermal diffusion can be prevented from being read, and an image signal having a wide dynamic range can be output from the image pick-up device, thereby an image of high quality can be obtained.

It is preferable that the read sequence controller of the image pick-up apparatus of the present invention cause a light signal to be read first from the R-sensor when the color temperature is low and cause a light signal to be read first from the B-sensor when the color temperature is high according to a result of discrimination executed-by the color temperature discriminating section.

With the above operation, when the color temperature is low, an amount of saturation charges which is less affected by the thermal diffusion can be read out from the R-sensor as well as when the color temperature is high, an amount of saturation charges which is less affected by the thermal diffusion can be read out from the B-sensor, thereby an image of higher quality can be obtained.

The read controller for the image pick-up device of the present invention discriminates the color temperature based on the light signals received by the image pick-up device and changes the read sequence of the fields according to a result of discrimination thereof. Accordingly, it is possible to read out a sufficiently large amount of saturation charges, thereby an image signal having a wide dynamic range can be output from the image pick-up device. Further, the image pick-up apparatus of the present invention can obtain an image of high quality by outputting the image signal having the wide dynamic range from the image pick-up device.

DETAILED DESCRIPTION OF THE INVENTION

An embodiment of the present invention will be explained below with reference to the drawings.

Figure 1:
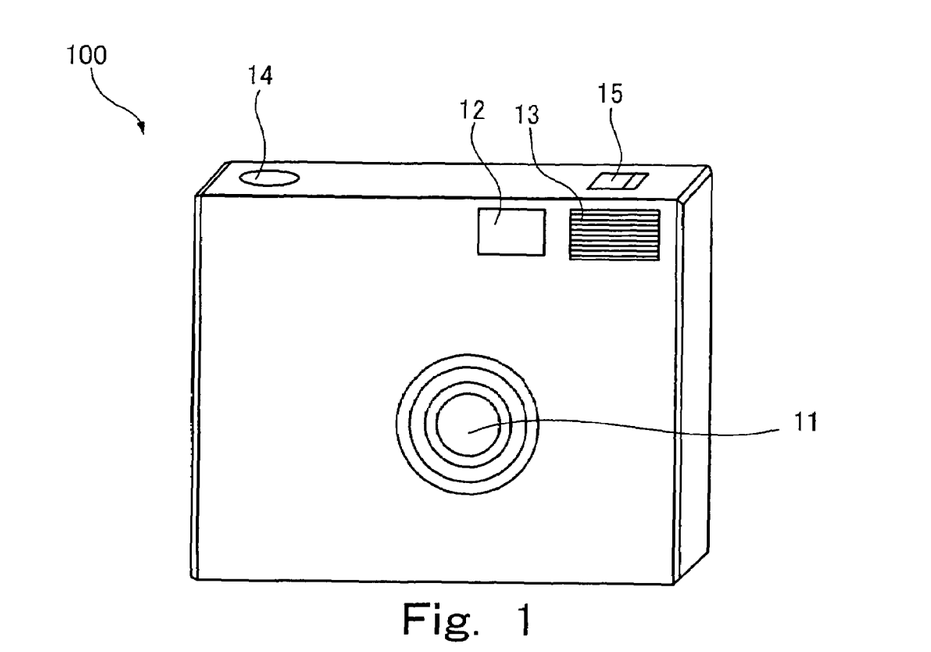
FIG. 1 is a perspective view of an outside appearance of a digital camera as an embodiment of the present invention when it is viewed from the obliquely upper front thereof.
Figure 2:
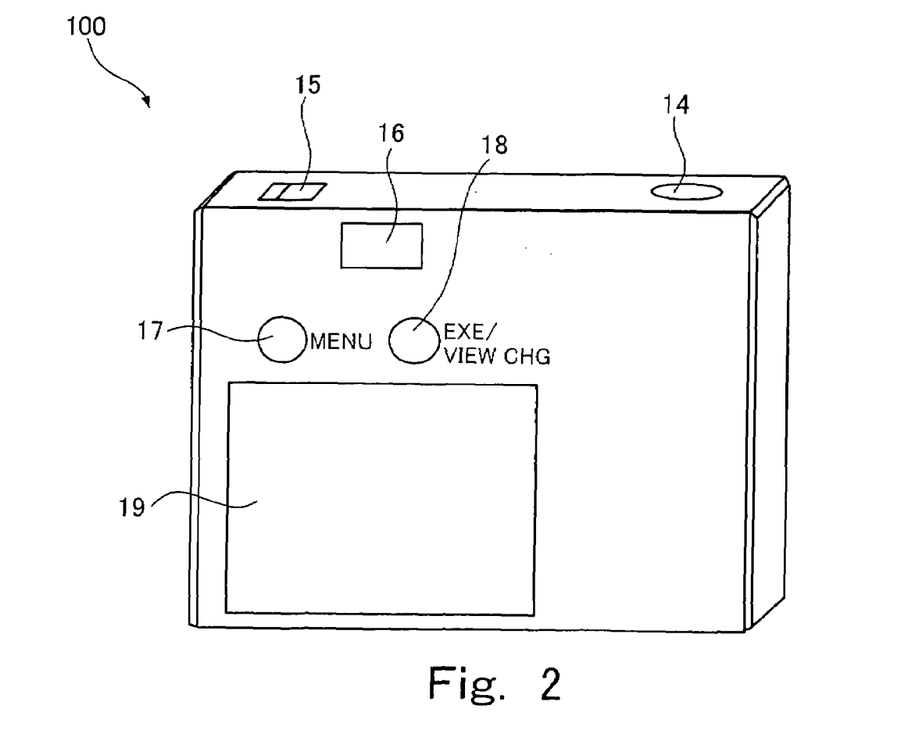
FIG. 2 is a perspective view of an outside appearance of the digital camera shown in FIG. 1 when it is viewed from the obliquely upper back thereof.

FIG. 1 is a perspective view of the outside appearance of a digital camera as an embodiment of an image pick-up apparatus of the present invention when it is viewed from the obliquely upper front thereof, and FIG. 2 is a perspective view of an outside appearance of the digital camera shown in FIG. 1 when it is viewed from the obliquely upper back thereof.

Note that an embodiment of a read controller for an image pick-up device of the present invention is assembled in the digital camera of the embodiment.

As shown in FIG. 1, an image pick-up lens 11 is disposed on a front surface of the digital camera 100 at a center thereof. Further, an optical finder objective window 12 and an auxiliary light emitter 13 are disposed on the front surface of the digital camera 100 in upper portions thereof. A shutter button 14 and a sliding power supply switch 15 are disposed on an upper surface of the digital camera 100.

As shown in FIG. 2, an optical finder ocular window 16, a menu switch 17, and an execution/screen changeover switch 18, and an image monitor 19 are disposed on a back surface of the digital camera 100.

Figure 3:
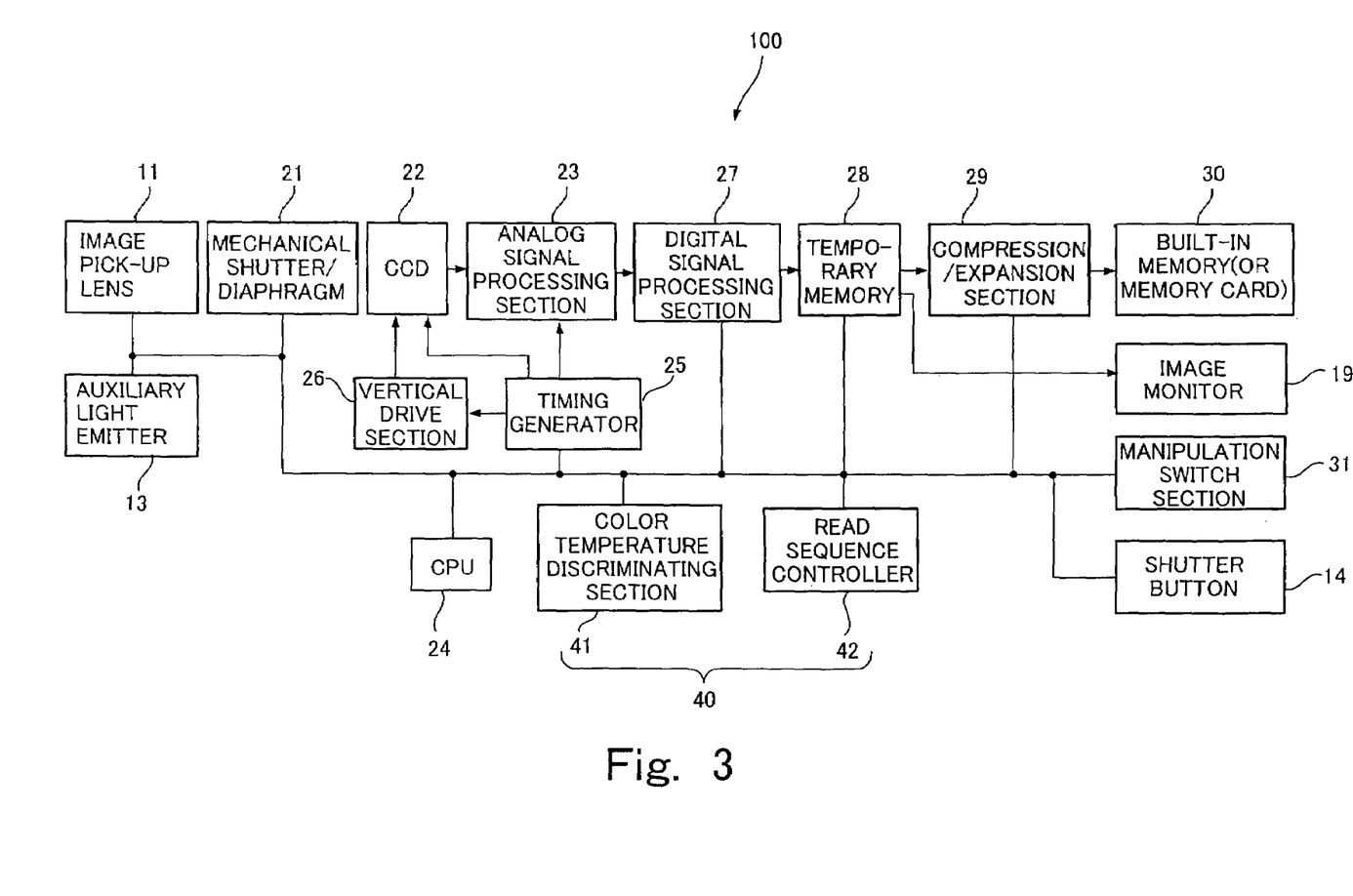
FIG. 3 is a block diagram showing a circuit arrangement of the digital camera shown in FIG. 1.

FIG. 3 is a block diagram showing a circuit arrangement of the digital camera shown in FIG. 1.

The digital camera 100 is provided with the image pick-up lens 11 and the auxiliary light emitter 13 described above. Further, the digital camera 100 is provided with a mechanical shutter/diaphragm 21, a CCD 22 (corresponding to an example of an image pick-up device referred to in the present invention), an analog signal processing section 23, a CPU 24 that integrally controls the operation of the digital camera 100, a timing generator 25, and a vertical drive section 26.

Object light, which passes through the image pick-up lens 11 and the mechanical shutter/diaphragm 21, is incident on the CCD 22. Although the detailed operation of the CCD 22 is described later, it converts the object light incident thereon into an analog image signal as an electric signal in synchronism with the signals from the timing generator 25 and the vertical drive section 26 and outputs the analog image signal.

The analog image signal output from the CCD 22 is subjected to analog signal processing by the analog signal processing section 23. In more detail, the analog signal processing section 23 subjects the analog image signal output from the CCD 22 to noise reduction processing, and the like, the analog image signal thus processed is subjected to A/D (analog/digital) conversion processing, and a resultant digital image signal is output.

Further, the digital camera 100 includes a digital signal processing section 27, a temporary memory 28, a compression/expansion section 29, a built-in memory (or memory card) 30, and the image monitor 19 described above. The digital image signal, which is subjected to the analog signal processing by the analog signal processing section 23 and also subjected to A/D conversion processing, is input to the digital signal processing section 27. The digital signal processing section 27 subjects the digital image signal input thereto to predetermined digital signal processing, completes image data expressing the image of an object of a scene picked up this time, and temporarily stores the image data in the temporary memory 28. The data stored in the temporary memory 28 is compressed by the compression/expansion section 29 and recorded in the built-in memory (or memory card) 30. Note that the data may be directly recorded in the built-in memory 30 omitting-the step of compression depending on a pick-up mode. The data stored in the temporary memory 28 is read out by the image monitor 19, thereby the image of the object is displayed thereon.

Further, the digital camera 100 includes a manipulation switch section 31 composed of the menu switch 17 and the execution/screen changeover switch 18 described above and the shutter button 14. When an image is picked up, a desired image pick-up state is set by manipulating the manipulation switch section 31, and the shutter button 14 is depressed.

The digital camera 100 further includes a read controller 40 for the image pick-up device (corresponding to an example of the read controller for the image pick-up device of the present invention) composed of a color temperature discriminating section 41 and a read sequence controller 42. The CCD 22 is provided with an R-sensor sensitive to red (R), a G-sensor sensitive to green (G), and a B-sensor sensitive to blue (B) each composed of photoelectric transducers, color filter arrays, and micro lenses. The read controller 40 for the image pick-up device controls reading (interlace reading) of light signals from at least two fields of the CCD 22 in which a field, from which a light signal received by the R-sensor sensitive to red light is read, is divided from a field from which a light signal received by the B-sensor sensitive to blue light is read.

The color temperature discriminating section 41 constituting the read controller 40 for the image pick-up device discriminates a color temperature based on the light signal received by the CCD 22. The read sequence controller 42 changes a sequence for reading the light signals from the fields according to a result of determination executed by the color temperature discriminating section 41. In more detail, the read sequence controller 42 causes a light signal to be read first from the R-sensor when the color temperature is low and causes a light signal to be read first from the B-sensor when the color temperature is high. This will be explained below with reference to FIG. 4.

Figure 4:
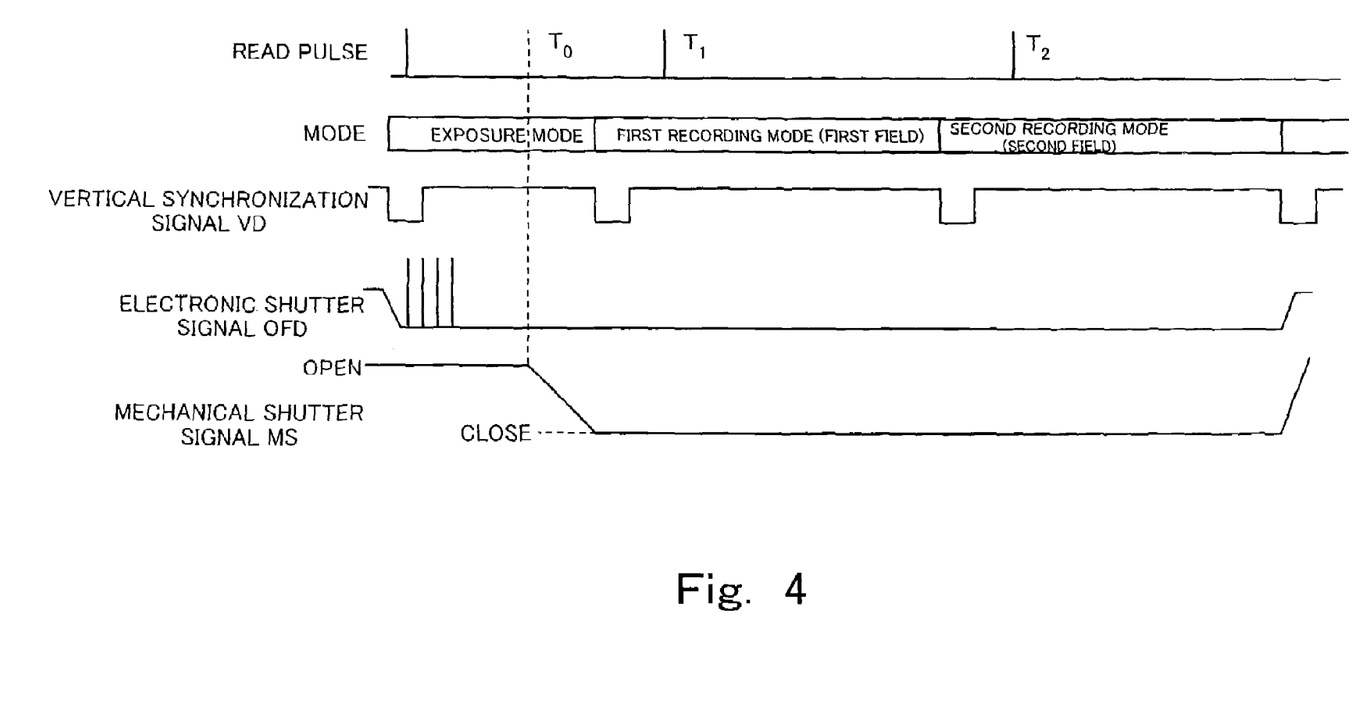
FIG. 4 is a view showing an interlace reading sequence in the digital camera shown in FIG. 3.

FIG. 4 is a view showing a sequence of interlace reading in the digital camera shown in FIG. 3.

FIG. 4 shows reading pulses for reading charges from the photoelectric transducer constituting the R-, G-, and B-sensors at times T1 and T2. FIG. 4 also shows an exposure mode and first and second recording modes. FIG. 4 further shows a vertical synchronization signal VD output from the vertical drive section 26, an electronic shutter signal OFD created based on the signal from the timing generator 25, and a mechanical shutter signal MS showing the open/close state of a mechanical shutter constituting the mechanical shutter/diaphragm 21.

In the digital camera 100, first, a through image for observing object light is displayed on the image monitor 19 in the exposure mode in the state that the mechanical shutter is opened. At the time, the shutter button 14 is depressed to pickup an image of the object. Thus, the electronic shutter signal OFD having a plurality of pulses is output, thereby the charges accumulated in the photoelectric transducers of the CCD 22 are discarded.

The mechanical shutter is closed at a time TO, and the mechanical shutter signal MS changes from "H" level to "L" level after a predetermined period time passes. Thus, the exposure mode shifts to a first recording mode (first field), and a reading pulse is output at the time T1 after a predetermined period of time passes. Here, the color temperature is previously discriminated by the color temperature discriminating section 41 based on the light signal received by the CCD 22. It is assumed here that the color temperature is discriminated low. Accordingly, the read sequence controller 42 causes the light signal received by the R-sensor to be read first. Note that light signal is also read from the G-sensor simultaneously with the reading of the light signal from the R-sensor.

After a predetermined period of time passes, the first recording mode (first field) shifts to a second recording mode (second field), and after a predetermined period of time passes, a reading pulse is output at the time T2. The read sequence controller 42 causes light signal to be read from the B-sensor in response to the reading pulse. Note that light signal is also read from the G-sensor simultaneously with the reading of the light signal from the B-sensor.

Figure 5:
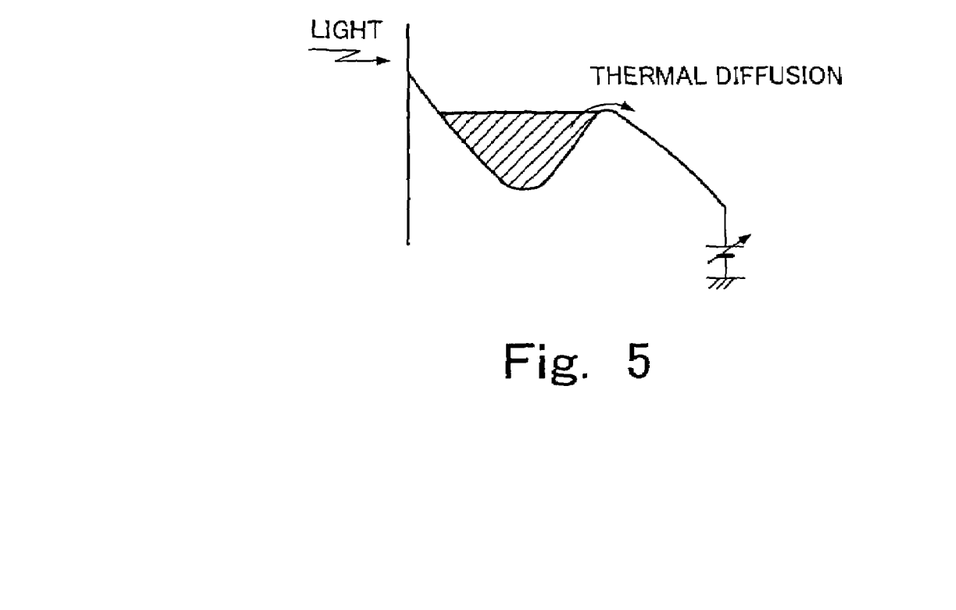
FIG. 5 is a view showing an accumulated state of signal charges accumulated in photoelectric transducers constituting a CCD.

FIG. 5 is a view showing an accumulated state of signal charges accumulated in the photoelectric transducer constituting the CCD.

In general, when light is incident on the photoelectric transducers constituting the CCD, signal charges are accumulated in so-called potential wells of the photoelectric transducers in the state shown by slant lines in FIG. 5. In a CCD employing an interlace reading system, there is a phenomenon that the amount of signal charges read by executing reading from the second field is reduced by the influence of thermal diffusion in a period during which reading from the first field is executed. That is, the maximum possible amount of signal charges (called the amount of saturation charges), which is read out by executing reading from the second field and can be accumulated, is reduced.

Figure 6:
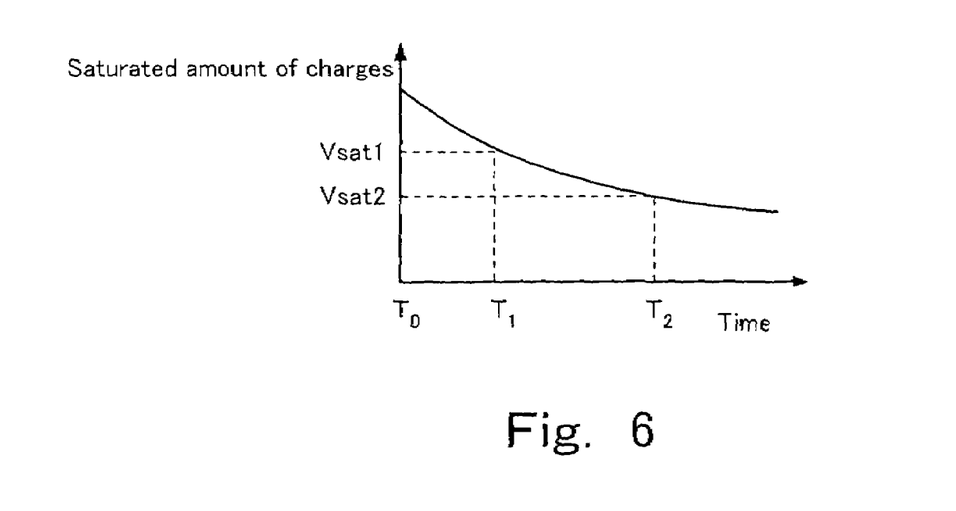
FIG. 6 is a graph showing how an amount of saturation charges is reduced by the influence of thermal diffusion.

FIG. 6 is a graph showing how the amount of saturation charges is reduced by the influence of thermal diffusion.

When the amount of saturation charges accumulated in the photoelectric transducers is read, it is not significantly reduced in the reading executed to the first field because it is less influenced by the thermal diffusion, and thus an electric potential Vsat1 showing the amount of saturation charges having been read out is relatively high. In contrast, in the reading executed to the second field (reading at the time T2), an electric potential Vsat2 showing the amount of saturation charges having been read is relatively low because it is reduced by the influence of thermal diffusion.

Figure 7:
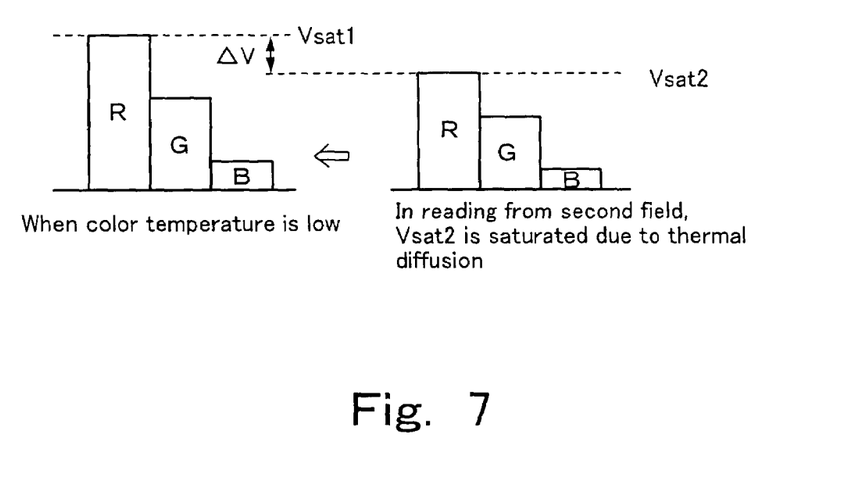
FIG. 7 is a view showing an example of an amount of charges read from R-, G-, B-sensors in the reading executed to both first and second fields when a color temperature is low.

FIG. 7 is a view showing an example of the amount of charges read from the R-, G-, B-sensors in the reading executed to both the first and second fields when the color temperature is low.

Shown on the left side of FIG. 7 is the amount of charges read from the R-, G-, and B-sensors in the reading executed to the first field when the color temperature is low. Further, shown on the right side of FIG. 7 is the amount of charges read from the R-, G-, and B-sensors in the reading executed to the second field when the color temperature is low. In the reading executed to any of the first and second fields, since the color temperature is low, a largest amount of charges (saturated amount of charges) is read by the R-sensor, a medium amount of charges is read by the G-sensor, and a smallest amount of charges is read from the B-sensor. Here, $\alpha V$ shows the difference between the electric potential Vsat1, which shows the amount of saturation charges from the R-sensor in the reading executed to the first field, and the electric potential Vsat2 showing the amount of saturation charges from the R-sensor in the reading executed to the second field. In a conventional digital camera, an amount of saturation charges is read in a read-out sequence determined uniformly. Accordingly, even if a color temperature is low, reading may be executed from the B-sensor first and then from the R-sensor. In this case, the electric potential Vsat2, which shows the amount of saturation charges from the R-sensor in the reading executed to the second field, is employed. As described above, in the conventional digital camera, the levels of image signals showing the respective R, G, B colors are determined based on the relatively low electric potential Vsat2 using it as a reference, and processing for determining white balance, and the like is executed based on these levels. Accordingly, it is difficult to obtain an image of high quality by the conventional digital camera because the image signals output from the CCD have a narrow dynamic range.

In the digital camera 100 of the embodiment, when the color temperature is low, the read controller 40 for the image pick-up device described above causes a light signal to be read first from the R-sensor. Accordingly, the levels of the image signals showing the R, G, B colors are determined based on the electric potential Vsat1 using it as a reference, the amount of saturation charges represented by the electric potential Vsat1 being ΔV larger than that represented by the electric potential Vsat2. Accordingly, the image signal output from the CCD 22 has a wide dynamic range, thereby an image of high quality can be obtained by the digital camera 100. Note that, when the color temperature is high, a light signal is read first from the B-sensor. In this case, the electric potential from the B-sensor corresponding to the above electric potential Vsat1 is used as the reference.

Figure 8:
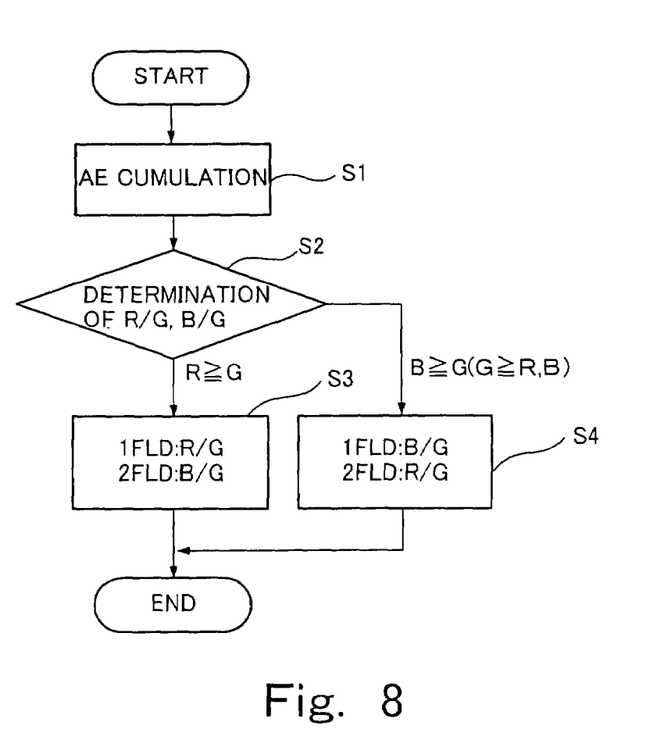
FIG. 8 is a flowchart of a processing routine in a read controller for an image pick-up device of the digital camera of the embodiment.

FIG. 8 is a flowchart of a processing routine in the read controller for the image pick-up device of the digital camera of the embodiment.

First, at step S1, AE cumulation processing is executed by the CPU 24 to determine AE cumulation data as the luminance information of an image. Next, at step S2, a color temperature is discriminated by the color temperature discriminating section 41 constituting the read controller 40 based on the thus determined AE cumulation data. Specifically, the color temperature discriminating section 41 discriminates whether the color temperature is low (R≧G) or high (B≧G). When the color temperature discriminating section 41 determines that the color temperature is low (R≧G), the process goes to step S3. At step S3, light signals are read from the R-sensors and G-sensors in the first field, and light signals are read from the B-sensors and G-sensors in the second field, thereby this routine is finished.

In contrast, when the color temperature discriminating section 41 discriminates at step S2 that the color temperature is high (B≧G) (otherwise, G≧R, B), the process goes to step S4. At step S4, light signals are read from the B-sensors and G-sensors in the first field, and light signals are read from the R-sensors and G-sensors in the second field, thereby this routine is finished.

Figure 9:
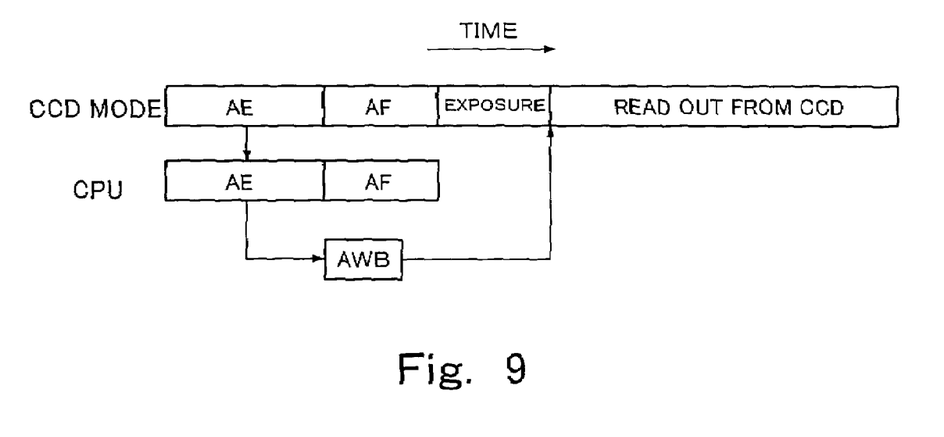
FIG. 9 is a view showing procedural steps for changing a read sequence of the CCD.

FIG. 9 is a view showing procedural steps for changing a read sequence in the CCD.

The AE processing is executed by the CPU 24 in an AE mode, in which the mechanical shutter is opened, of CCD modes showing the operating states of the CCD 22 to determine the AE cumulation data as the luminance information of the image. Next, the AE mode shifts to an AF mode. In the AF mode, AF processing is executed by the CPU 24 to determine the focus data of an image. Further, the mechanical shutter is closed, and the AF mode shift to the exposure mode in which the signal charges of the R, G, B colors are accumulated. Next, the exposure mode shifts to a CCD read mode. AWB processing is executed in the period from the AE mode to the exposure mode to determine white balance data based on the AE cumulation data described above, the color temperature is discriminated with reference to the white balance data, and the reading sequence of the fields is changed in a CCD reading mode according to a result of discrimination.

It should be noted that, although the embodiment is described by exemplifying the digital camera as the image pick-up apparatus of the present invention, the image pick-up apparatus of the present invention is by no means limited to the digital camera and it may be, for example, a mobile phone with a camera function which become widespread recently.

What is claimed is:

1. A read controller for an image pick-up device that controls reading of light signals from at least two fields in which a field, from which a light signal received by an R-sensor sensitive to red light is read, is separated from a field from which a light signal received by a B-sensor sensitive to blue light is read, the read controller comprising:
   a color temperature discriminating section that discriminates a color temperature based on the light signals received by the image pick-up device; and
   a read sequence controller that changes a read sequence of the fields according to a result of discrimination executed by the color temperature discriminating section.

2. A read controller for an image pick-up device according to claim 1, wherein the read sequence controller causes a light signal to be read first from the R-sensor when the color temperature is low and causes a light signal to be read first from the B-sensor when the color temperature is high according to a result of discrimination executed by the color temperature discriminating section.

3. An image pick-up apparatus that captures object light by an image pick-up device and creates an image signal, the image pick-up device being an interlace reading type image pick-up device that reads light signals from at least two fields in which a field, from which a light signal received by an R-sensor sensitive to red light is read, is separated from a field from which a light signal received by a B-sensor sensitive to blue light is read, the image pick-up apparatus comprises:
   a color temperature discriminating section that discriminates a color temperature based on the light signal received by the image pick-up device; and
   a read sequence controller that changes a read sequence of the fields according to a result of discrimination executed by the color temperature discriminating section.

4. An image pick-up apparatus according to claim 3, wherein the read sequence controller causes a light signal to be read first from the R-sensor when the color temperature is low and causes a light signal to be read first from the B-sensor when the color temperature is high according to a result of discrimination executed by the color temperature discriminating section.

* * * * *